United States Patent [19]

Leibowitz

[11] 4,116,546
[45] Sep. 26, 1978

[54] ELECTROCHROMIC DEVICE WITH CATIONIC ION EXCHANGE RESIN SEPARATOR

[75] Inventor: Marshall Leibowitz, Ridgefield, Conn.

[73] Assignee: Timex Corporation, Waterbury, Conn.

[21] Appl. No.: 791,536

[22] Filed: Apr. 27, 1977

Related U.S. Application Data

[63] Continuation-in-part of Ser. No. 616,224, Sep. 24, 1975, abandoned.

[51] Int. Cl.[2] .............................................. G02F 1/36
[52] U.S. Cl. ................................................... 350/356
[58] Field of Search .......................... 350/160 R, 356; 340/324 M

[56] References Cited

U.S. PATENT DOCUMENTS

| 3,840,288 | 10/1974 | Schnatterly | 350/160 R |
| 3,879,108 | 4/1975 | Berets | 350/160 R |

Primary Examiner—William L. Sikes
Attorney, Agent, or Firm—William C. Crutcher

[57] ABSTRACT

An electrochromic display device in layered form having a first transparent substrate with a selectively actuable transparent electrode thereon and a first electrochromic layer on said transparent electrode, in combination with a counterelectrode having a second electrochromic layer thereon, and a solid electrolyte-separator layer between said first and said second electrochromic layers, said electrolyte-separator being comprised of a cationic ion exchange resin, specifically, a membrane of the acid form of a soluble polystyrene sulfonic acid polymer chemically wetted with water.

12 Claims, 2 Drawing Figures

ELECTROCHROMIC DEVICE WITH CATIONIC ION EXCHANGE RESIN SEPARATOR

RELATED APPLICATIONS

This application is a continuation in part of application Ser. No. 616,224, filed on Sept. 24, 1975 and now abandoned.

BACKGROUND OF THE INVENTION

This invention relates to displays made from electrochromic materials, and more particularly to such displays having an ion-conducting medium for ion transfer disposed between spaced layers of electrochromic material.

The term "electrochromic material" as used herein is defined in the literature, and is understood in the art to mean or to refer to a material responsive to the application of an electric field of a given polarity to change from a first stable persistent state in which it is essentially non-absorbtive of electromagnetic radiation in a given wave length region, and hence clear or substantially colorless, to a second stable persistent state in which it is absorbtive of electromagnetic radiation in the given wave length region, and hence colored. Once in said second stable state, it is responsive to the re-application of an electric field of the opposite polarity to return to its first stable state. As is well known in this art, the phenomenon is evidenced by a change in color, for example, the change in color from essentially clear to blue, and back to clear, obtained by electrically reducing thin films of tungsten (VI) oxides in a sulfuric acid electrolyte, as described in Journal of the American Chemical Society (Vol. 73, pp. 5427-5732, Nov. 1951) at p. 5429 in an article by Brimm et al. entitled "=Sodium Potassium Tungsten Bronzes."

There are numerous examples in the art to which the present invention relates of fabrication of devices incorporating electrochromic materials. For example, devices in which one layer of electrochromic material is sandwiched with or without an ion-conducting material, such as an electrolyte, between two conductive electrode surfaces are shown in Talmey U.S. Pat. Nos. 2,173,141, 2,281,013 and 2,319,765, Deb et al. U.S. Pat. No. 3,521,941, and Deb U.S. Pat. No. 3,829,196. Devices incorporating two layers of electrochromic materials between two electrodes and separated by an ion conducting medium are shown in Brimm et al. supra, Giglia et al. U.S. Pat. No. 3,827,784, Witzke et al. U.S. Pat. No. 3,840,287, Bruesch et al. U.S. Pat. No. 3,971,624, Giglia U.S. Pat. No. 3,973,829, and Leibowitz U.S. Pat. No. 4,012,831.

Prior art devices which incorporate crystalline or solid state ion conducting media, for example, Deb et al. U.S. Pat. No. 3,521,941, Bruesch et al. U.S. Pat. No. 3,971,624, Jasinski U.S. Pat. No. 3,995,943, and Kasai U.S. Pat. No. 4,009,936 exhibit switching speeds from clear to colored to clear states, which are too slow for many display applications, for example, timepiece displays. Moreover, prior art devices which utilize concentrated acids in liquid or semi-solid form, for example, sulfuric acids as shown in Witzke et al. U.S. Pat. No. 3,840,287, also exhibit the same defects, and as well additional defects in that (1) the concentrated acid promotes the migration of anions from one layer of electrochromic material to another, and (2) the concentrated acid attacks, and ultimately destroys, conventional seals of the device.

Furthermore, when the insoluble form of cationic ion exchange resins is utilized, as disclosed in Bruesch et al. U.S. Pat. No. 3,971,624 (at col. 4, lines 27-29), as an ion conductive material between two layers of solid electrochromic materials, additional problems are encountered. For example, proper operation of the display requires continual uniform contact between both layers of electrochromic material and the cationic ion exchange resin. Cationic ion exchange resins disclosed for this purpose in the prior art, for example in Bruesch et al. supra, and Kissa U.S. Pat. No. 3,453,038 (at col. 5, lines 18-34), are in the form of insoluble sheets or insoluble powders. The sheet form is thick, and ultimately exhibits discontinuities in contact between two solid layers of electrochromic material, as well as exhibiting expansion when chemically wetted. Such sheet materials when chemically wetted expand significantly in volume causing physical separation of the substrates of the fabricated device, and consequent leakage of fluids contained therein. Resins fabricated in powder form are difficult to work with from a manufacturing standpoint, since the insoluble powder must first be dispersed in a binder before being placed between two layers of electrochromic material.

It is, therefore, the purpose of the present invention to provide a display device, incorporating spaced layers of solid electrochromic material, which is significantly less subject to degradation than prior devices, because no liquid electrolyte is employed, thereby obtaining improved sealing of the display construction, and having improved ionic transfer between the electrochromic layers due to the mobility of hydrated hydrogen ions and having improved switching speeds due to the blocking of passage of anions through the ion transferring medium.

SUMMARY OF THE INVENTION

Electrochromic displays of the kind described according to the present invention incorporate a soluble cationic ion exchange resin e.g., a membrane of the acid form of a soluble polystyrene sulfonic acid polymer chemically wetted with water, or a membrane of the acid form of a soluble perfluorosulfonic acid polymer chemically wetted with water, located between the solid electrochromic layers of the display, one of which is an electrochromic counterelectrode of the kind disclosed in my U.S. Pat. No. 4,012,831. By utilizing the soluble cationic ion exchange resin as the electrolyte-separator layer, the function of the electrolyte can be accomplished without any free acid being present in the display as is required in present displays which utilize acid electrolytes.

The electrolyte-separator layer of the present invention may be formed directly on one of the solid electrochromic material layers by casting, spraying, or the like. The soluble cationic ion exchange resin provides the necessary conductivity for operation of the display, it is believed, by enhancing the mobility of hydrated hydrogen ions through the resin layer. Acid groups, which are normally free when a liquid sulfuric acid is employed, do not move; it is therefore believed that the corrosive and degradative effects on the display's seal and switching speed, which are normally encountered, are eliminated or at least vastly minimized with displays according to the present invention.

As disclosed in Kissa U.S. Pat. No. 3,453,038 (at col. 5, lines 59-63), Giglia U.S. Pat. No. 3,892,472, and Leibowitz U.S. Pat. No. 3,944,333, greater contrast of the display can be effected if pigments are incorporated into the separator, or if the pigment is held in place by the separator between one electrochromic layer and the separator.

Preferred soluble polystyrene sulfonic acid polymer cationic ion exchange resins are known to those skilled in the art, and particularly preferred are the family of soluble polystyrene sulfonates marketed by National Starch and Chemical Corporation under the U.S. Registered trademark VERSA-TL, e.g. VERSA-TL 71, VERSA-TL 20 series, VERSA-TL 70 series, VERSA-TL 400 series, VERSA-TL 500 series, VERSA-TL 700 series, and the like.

The utilization of a soluble acid polymer cationic ion exchange resin, e.g., soluble polystyrene sulfonic acid polymer cationic ion exchange resin, as the electrolyte-separator in display devices according to the present invention eliminates the presence of a liquid or semi-solid acid electrolyte and thus the need for the presence of significant amounts of sulfuric or other strong acids, which previously were utilized as electrolytes. This minimizes the difficulties of sealing the display initially and of deterioration of the seal over a period of time. It especially prevents or greatly minimizes the passage of anions from the counterelectrode electrochromic material through the electrolyte-separator to the display electrode electrochromic material, thereby dramatically improving the display's switching speed.

While the present invention eliminates the presence of electrolyte in liquid form, in order to activate the electrolyte-separator member, it must be "chemically wet" with water. It is not necessary nor desirable that flowable liquid be present in the membrane after chemically wetting it.

The soluble polystyrene sulfonic acid polymer membrane is especially preferred because it is very selectively permeable to positively charged ions and impermeable to negatively charged ions, and extremely inert, being comprised of a polymer chain, having attached thereto negatively charged and essentially immobile sulfonic acid groups. Such polymer combines extremely good ionic selectively with low resistance to cationic flow, ease of application, and high physical strength.

Thus the electrolyte-separator of the present invention is comprised of a membrane of a soluble acid polymer cationic ion exchange resin, e.g., a soluble polystyrene sulfonic acid polymer cationic ion exchange resin, which is permeable to positively charged ions or cations, but essentially impermeable to negatively charged ions or anions.

This cationic ion exchange resin allows preferential migration of hydrated hydrogen ions and prevents electrophoretic diffusion of colloidal particles from the electrochromic counterelectrode to the electrochromic display electrode.

BRIEF DESCRIPTION OF THE DRAWING

In the accompanying drawing which forms a part of the specification.

DETAILED DESCRIPTION OF THE INVENTION

Figure 1:
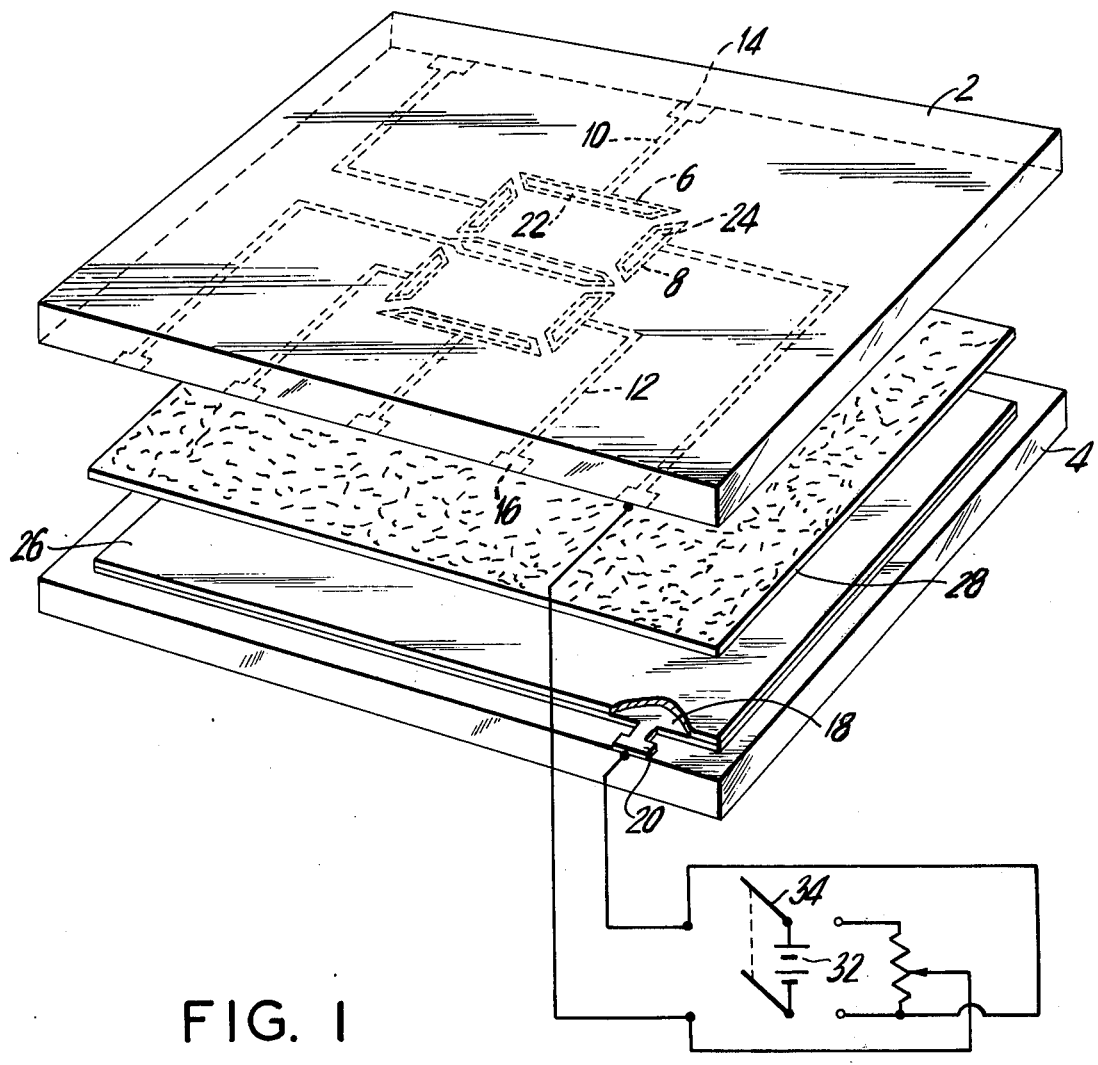
FIG. 1 is an exploded perspective view of a typical electrochromic display incorporating the present invention, and, FIG. 2 is an enlarged cross sectional view taken through an assembled display of the kind shown in FIG. 1.

Referring now to FIG. 1 of the drawings, the display device is shown as a sandwich construction comprising a first transparent substrate 2 and a second spaced substrate or section 4, which need not be transparent, and a separator-electrolyte layer 28 made from a soluble acid polymer cationic ion exchange resin, e.g., soluble polystyrene sulfonic acid polymer, between the elements 2 and 4.

The present invention is concerned primarily with this separator-electrolyte layer in combination with the electrochromic counterelectrode disclosed in Leibowitz U.S. Pat. No. 4,012,831, and the improved displays resulting from this combination, although, when the separator-electrolyte layer which is described in detail below is employed in other displays of the kind described above, the operation and life of such other displays are improved.

As depicted in FIG. 1, substrate 2 has a conductive pattern of transparent electrodes on the underside thereof in the form of a pattern such as segments 6, 8 comprised of segments which can be selectively actuated to form digits or other optical patterns via conductive leads 10, 12 leading to terminals 14, 16.

Substrate 2 may be of transparent glass or plastic with the transparent electrodes 6, 8 thereon formed of a clear, conductive material such as tin oxide, applied using known methods.

The pattern for example may be etched on the substrate by using a commercially available material such as NESA glass and then removing the conductive coating except for electrodes 6, 8.

The second section 4 has a conductive counterelectrode 18 thereon. Section 4 may be of glass, ceramic or plastic, coated with a conductive layer 18 connected to terminal 29.

Formed on the transparent electrode segments 6, 8 and also on the conductive layer 18 are layers of electrochromic material indicated as 22, 24, 26. The electrochromic material layers 22, 24 on segments 6, 8 respectively are applied by suitable masking techniques to cover a smaller area than the electrodes, so as to give good edge definition.

There are many suitable solid electrochromic materials which change their colors according to the particular oxide state, for example, tungsten (VI) oxide, disclosed by Brimm et al. The suitable materials are well known to those skilled in the art and there is no need to list in detail the many materials which can be used in the practice of this invention. Merely by way of example, a large number of conventional materials, which can be used, are identified in the U.S. Patents to Talmey, supra. I prefer to employ tungsten (VI) oxide as the electrochromic material for layers 22, 24. Tungsten (VI) oxide is preferably deposited on segments 6, 8 by vacuum evaporation, or other conventional processes. The electrochromic counterelectrode layer 26 is, however, formed in accordance with the method taught in my patent U.S. Pat. No. 4,012,831. The electrochromic material 26 formed thereby is brown in color, is stable in air, and contains substantially more capacity to color the front electrochromic layers 22, 24 than the blue counterelectrode disclosed in Witzke et al. U.S. Pat. No. 3,840,287, or than the partially electrically charged or partially "blued" counterelectrode disclosed in Giglia U.S. Pat. No. 3,973,829.

Figure 2:
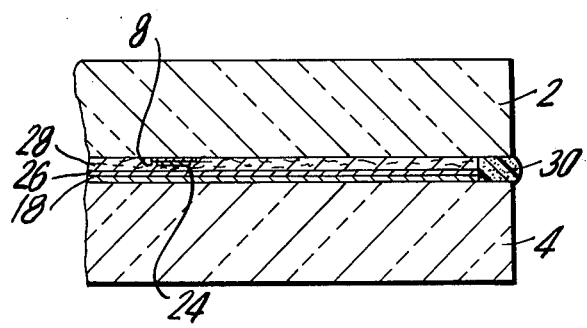

Referring to FIG. 2 of the drawing, an assembled display according to the present invention is shown in cross section. The elements 2 and 4 are bound to one another by an adhesive 30 such as epoxy which serves to hold the assembly together and to seal the inner layers around the periphery of the sandwich structure between the elements 2 and 4.

Illustrated in the drawing are conventional circuit and conductors for actuating the display element for applying an electric charge from the battery 32 to, for example, selected segment 8 to a terminal 16 and the counterelectrode 18 at terminal 20. The polarity of the applied voltage may be reversed to erase the image formed, by the actuation of the two-pole double-throw switch 34.

The electrochromic material of layers 22 and 24 may range in thickness from 0.1 to 100 microns, however, a thickness of approximately 1 to 10 microns or less is preferred; the thickness of the electrochromic material layer 26 is about 25 microns.

The separator 28 which serves as the solid electrolyte for the display device is usually on the order of 25 to 75 microns in thickness. The solid electrolyte-separator utilized in this invention is a soluble, selectively permeable cationic ion exchange resin made for example from a soluble polystyrene sulfonic acid polymer. It has a high degree of perferential transportability for cations as opposed to anions, and also for hydrogen ions as opposed to other cations. Optionally, as disclosed for example in Kissa U.S. Pat. No. 3,453,038, Giglia U.S. Pat. No. 3,892,472, and Leibowitz U.S. Pat. No. 3,944,333, and opacifier or a contrast enhancing opaque pigment, such as titanium dioxide, can be incorporated in the separatorelectrolyte material to conceal the counterelectrode 18, 26 from the field of view of the optical patterns formed by segments 6, 8. The separator 28 preferably comprises a membrane formed directly on the electrochromic layers 22, 24 or 26 by spraying, casting and the like.

Before or after assembly, the separator-electrolyte is chemically wet with water, or a water solution of the soluble acid polymer cationic ion exchange resin incorporated in the separator e.g., a water solution of polystyrene sulfonic acid polymer. For best results in the form of stability of the electrochromic layers, no liquid excess moisture should be present, i.e., the cationic ion exchange resin layer should only be chemically wet and no more.

While the invention has been explained by a detailed description of certain specific embodiments, it is to be understood that various modifications and substitutions can be made in any of them within the scope of the appended claims which are intended also to include equivalents of such embodiments.

What is claimed is:

1. An electrochromic display device comprising in layered form, a first transparent substrate with a selectively actuatable transparent electrode thereon and a first electrochromic layer on said transparent electrode, a counterelectrode having a second electrochromic layer thereon, with an electrolyte-separator layer between said electrochromic layers, wherein the improvement comprises a solid electrolyte-separator comprised of a soluble polymer cationic ion exchange resin in the acid form, chemically wetted.

2. An electrochromic display device in accordance with claim 1 wherein said resin comprises a soluble polystyrene sulfonic acid polymer cationic ion exchange resin.

3. An electrochromic display device in accordance with claim 2 wherein said first electrochromic layer comprises tungsten (VI) oxide, and said second electrochromic layer comprises tungsten oxide heat treated in a hydrogen or forming gas atmosphere.

4. An electrochromic display device in accordance with claim 2 wherein said first electrochromic layer comprises tungsten (VI) oxide and said second electrochromic layer comprises tungsten surface oxidized and heat treated in a hydrogen or forming gas atmosphere.

5. An electrochromic display device in accordance with claim 3 wherein the thicknesses of said first electrochromic layer said said second electrochromic layer are on the ratio of 1:5 at least.

6. An electrochromic display device in accordance with claim 4 wherein the thicknesses of said first electrochromic layer and said second electrochromic layer are on the ratio of 1:5 at least.

7. An electrochromic display device in accordance with claim 3 wherein said electrolyte-separator layer has an opacifying agent incorporated therein, and is chemically wetted with water.

8. An electrochromic display device in accordance with claim 3 wherein said electrolyte-separator layer has an opacifying agent incorporated therein, and is chemically wetted with an aqueous solution of said soluble polystyrene resin.

9. An electrochromic display device in accordance with claim 4 wherein said electrolyte-separator layer has an opacifying agent incorporated therein, and is chemically wetted with water.

10. An electrochromic display device in accordance with claim 4 wherein said electrolyte-separator layer has an opacifying agent incorporated therein, and is chemically wetted with an aqueous solution of said soluble polystyrene resin.

11. An electrochromic display device in accordance with claim 5 wherein said electrolyte-separator layer has an opacifying agent incorporated therein, and is chemically wetted with water.

12. An electrochromic display device in accordance with claim 6 wherein said electrolyte-separator layer has an opacifying agent incorporated therein, and is chemically wetted with an aqueous solution of said soluble polystyrene resin.

* * * * *